J. L. JUDGE.
VALVE.
APPLICATION FILED FEB. 18, 1902.
935,113.
Patented Sept. 28, 1909.
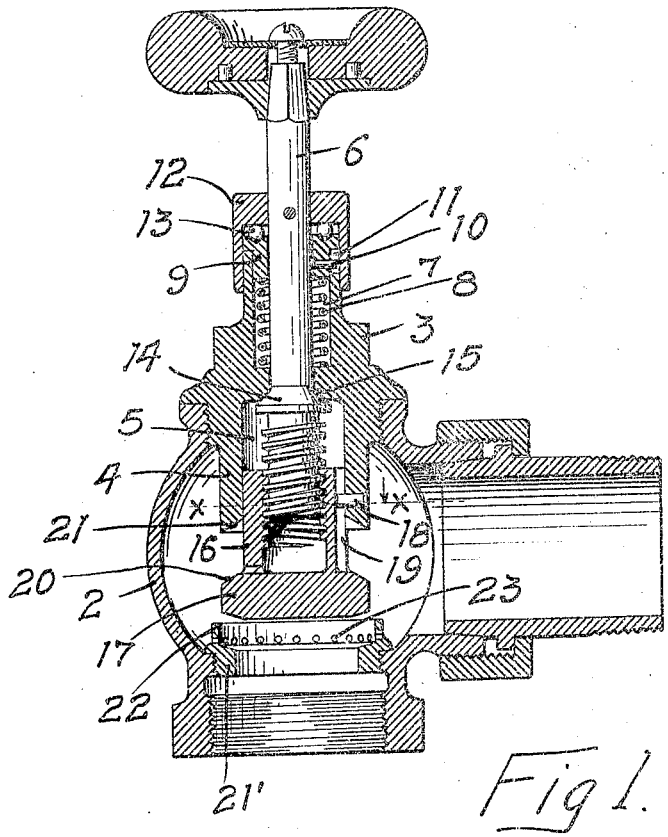
Fig 1.
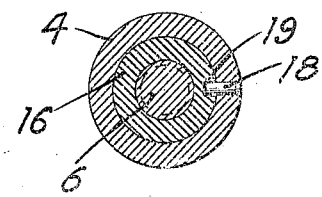
Fig 2. x-x
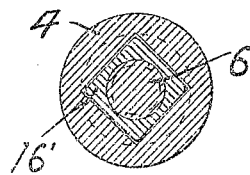
Fig 3.
WITNESSES
INVENTOR
JAMES L. JUDGE
BY
HIS ATTORNEYS

UNITED STATES PATENT OFFICE.

JAMES L. JUDGE, OF MINNEAPOLIS, MINNESOTA.

VALVE.

935,113.     Specification of Letters Patent.     Patented Sept. 28, 1909.

Application filed February 18, 1908. Serial No. 416,470.

*To all whom it may concern:*

Be it known that I, JAMES L. JUDGE, of Minneapolis, Hennepin county, Minnesota, have invented certain new and useful Improvements in Valves, of which the following is a specification.

The object of my invention is to provide a valve which will not require any packing around the stem and is designed as an improvement over the valve shown and described in a certain pending application filed by me July 1st, 1907, Serial No. 381,613.

In the accompanying drawings, forming part of this specification, Figure 1 is a sectional view of a valve embodying my invention. Fig. 2 is a sectional view on the line $x$—$x$ of Fig. 1. Fig. 3 illustrates a modified construction.

In the drawing, 2 represents a valve casing, and 3 a valve bonnet that is removably mounted in the top of the valve casing. The bonnet 3 has a flange 4 at its lower end inclosing a chamber 5. A valve stem 6 extends through the bonnet and through a recess 7 wherein a coiled spring 8 is arranged. A follower 9 fits within the end of the recess 7 and has a pin 10 slidable in a slot 11. A cap 12 secured to the valve stem has a ball bearing 13 on the top of the plug. A bevel-faced disk 14 is mounted on the stem 6 and a seat 15 therefor is formed in the valve bonnet at the upper end of the chamber 5. The lower end of the valve stem 6 is threaded to fit into an interiorly threaded sleeve 16 mounted on the valve disk 17, said sleeve being adapted to slide in the chamber 5 and prevented from rotating therein by a pin 18 fitting within a vertical slot 19 in said sleeve. The disk 17 has a beveled upper face 20 to engage a seat 21 on the lower end of the flange 4 so that when the disk is raised to the limit of its upward movement the entrance to the chamber 5 will be closed and the valve adapted for use on vacuum systems where the suction might compress the stem spring and permit entrance of air around the valve stem. A seat 21' is provided in the valve casing for the disk 17 and a flange 22 surrounds the said seat and is provided with a series of comparatively small perforations 23. This flange prevents sediment from the radiators lodging on the valve seat while allowing water to flow freely through the valve. It will be understood that when the valve stem is turned the disk 17 will be raised or lowered to open or close the valve. Rotary movement of the disk will be prevented by the pin 18 and as the stem is revolved the disk will be raised or lowered. The disk 14 contacting with its seat in the bonnet will prevent the escape of steam or water from the valve, and being held by the spring device on its seat will dispense with the usual packing required around the stem.

In Fig. 3 a modification is shown which consists in providing a sleeve 16' that is rectangular in cross section to fit a correspondingly shaped socket in the valve bonnet and dispensing with the groove and guiding pin.

In place of the integral flange 22 on the seat of the valve I may provide a wall consisting of fine wire mesh having substantially the same functions as the flange 22 with the series of perforations.

I claim as my invention:

1. A valve comprising a casing having a ring removably arranged therein, the top of said ring having a vertical flange formed thereon and provided with a series of perforations which are too small to allow passage of sediment from the radiators on to the valve seat, but allow the free passage of water therethrough and the upper portion of said ring inclosed by said flange having a beveled valve seat and a valve disk adapted to fit within said flange and contact with said seat and a stem connected with said disk.

2. A valve comprising a casing having a seat therein, a vertical flange inclosing said seat and provided with a series of comparatively small perforations which will prevent sediment from passing therethrough and lodging on the valve seat, and a disk adapted to fit within said flange and contact with said seat, substantially as described.

3. A valve comprising a casing, a ring removably mounted therein, a perforated wall formed on said ring and removable from said casing with said ring, said perforations being comparatively small and preventing the passage of sediment but allowing water to flow freely therethrough, said ring having a seat inclosed by said wall and a valve disk adapted to fit within said wall and engage said seat and provided with a suitable stem.

4. A steam valve, comprising a casing having a seat, a bonnet mounted on said casing, a valve stem fitting within said bonnet, a disk carried by said stem and adapted to engage said seat and a flange having a series of perforations therein and inclosing said seat, said perforations being comparatively small and located in the lower portion of said flange and preventing the passage of sediment from the radiator but permitting water to flow freely therethrough.

In witness whereof, I have hereunto set my hand this 8th day of February 1908.

JAMES L. JUDGE.

Witnesses:
 RICHARD PAUL,
 J. A. BYINGTON.